(12) United States Patent
Penczek et al.

(10) Patent No.: US 9,422,391 B2
(45) Date of Patent: Aug. 23, 2016

(54) ORGANOMINERAL SOLID AND FOAMED MATERIAL

(71) Applicant: MINOVA INTERNATIONAL LIMITED, Derbyshire (GB)

(72) Inventors: Robert Penczek, Myslowice (PL); Jan Franek, Katowice (PL); Krzysztof Chabrzyk, Czeladz (PL); Stanislaw Makarski, Gliwice (PL); Mariusz Rasek, Chorzow (PL); Olga Krizanovic, Herdecke (DE)

(73) Assignee: MINOVA INTERNATIONAL LIMITED, Chesterfield, Derbyshire (GB)

( * ) Notice: Subject to any disclaimer, the term of this patent is extended or adjusted under 35 U.S.C. 154(b) by 60 days.

(21) Appl. No.: 14/350,676

(22) PCT Filed: Oct. 10, 2012

(86) PCT No.: PCT/GB2012/052508
§ 371 (c)(1),
(2) Date: Apr. 9, 2014

(87) PCT Pub. No.: WO2013/054106
PCT Pub. Date: Apr. 18, 2013

(65) Prior Publication Data
US 2015/0126632 A1    May 7, 2015

(30) Foreign Application Priority Data

Oct. 10, 2011   (GB) .................................. 1117417.4
Feb. 10, 2012   (CN) .......................... 2012 1 0030568

(51) Int. Cl.
| | |
|---|---|
| C08G 18/08 | (2006.01) |
| C08J 9/08 | (2006.01) |
| C08G 18/30 | (2006.01) |
| C08J 9/00 | (2006.01) |
| C08G 18/10 | (2006.01) |
| C08K 3/22 | (2006.01) |
| C08K 3/26 | (2006.01) |
| C09K 17/40 | (2006.01) |
| C08G 18/22 | (2006.01) |
| C09K 17/48 | (2006.01) |
| C08G 18/38 | (2006.01) |
| C08G 101/00 | (2006.01) |

(52) U.S. Cl.
CPC .............. *C08G 18/302* (2013.01); *C08G 18/10* (2013.01); *C08G 18/14* (2013.01); *C08G 18/222* (2013.01); *C08G 18/225* (2013.01); *C08G 18/3895* (2013.01); *C08J 9/0066* (2013.01); *C08J 9/08* (2013.01); *C08K 3/22* (2013.01); *C08K 3/26* (2013.01); *C09K 17/40* (2013.01); *C09K 17/48* (2013.01); *C08G 2101/00* (2013.01); *C08G 2101/0066* (2013.01); *C08G 2101/0083* (2013.01); *C08G 2170/60* (2013.01); *C08J 2203/06* (2013.01); *C08J 2207/02* (2013.01); *C08J 2375/04* (2013.01); *C08K 2003/2206* (2013.01); *C08K 2003/2224* (2013.01); *C08K 2003/262* (2013.01)

(58) Field of Classification Search
CPC ...... C08G 18/10; C08G 18/14; C08G 18/222; C08G 18/225; C08G 18/302; C08G 18/3895; C08G 2101/00; C08G 2101/0066; C08G 2101/0083; C08G 2170/60; C08J 9/0066; C08J 9/08; C08J 2203/06; C08J 2207/02; C08J 2375/04; C08K 3/22; C08K 3/26; C08K 2003/2206; C08K 2003/2224; C08K 2003/02; C08K 2003/262; C09K 17/40; C09K 17/48

See application file for complete search history.

(56) References Cited

U.S. PATENT DOCUMENTS

| | | | | |
|---|---|---|---|---|
| 4,291,129 | A * | 9/1981 | Kennedy ............ | C08G 18/6484 521/103 |
| 4,520,139 | A * | 5/1985 | Kennedy ............ | C08G 18/6484 106/162.9 |
| 5,039,711 | A | 8/1991 | Blount | |
| 5,093,416 | A | 3/1992 | Blount | |
| 5,622,999 | A | 4/1997 | Nagy et al. | |
| 2003/0073766 | A1 | 4/2003 | Bode | |

FOREIGN PATENT DOCUMENTS

EP      1 391 440      2/2004

OTHER PUBLICATIONS

International Search Report for PCT/GB2012/052508, mailed Sep. 5, 2013.

\* cited by examiner

*Primary Examiner* — Irina S Zemel
(74) *Attorney, Agent, or Firm* — Nixon & Vanderhye P.C.

(57) ABSTRACT

The present invention relates to a two-part composition suitable for use in the preparation of a foamed material wherein the first part comprises a source of metal ions and water and the second part comprises an isocyanate, wherein the ratio of NCO isocyanate to water to metal ions is 1 mol:3.5 to 5.5 mol:95 to 650 mmol. Also forming part of the invention is a foamed isocyanate material, a method of preparing the material and controlling foam formation and uses of the composition and material.

17 Claims, No Drawings

ORGANOMINERAL SOLID AND FOAMED MATERIAL

This application is the U.S. national phase of International Application No. PCT/GB2012/052508, filed 10 Oct. 2012, which designated the U.S. and claims priority to GB Application No. 1117417.4, filed 10 Oct. 2011, and CN Application No. 201210030568.9, filed 10 Feb. 2012, the entire contents of each of which are hereby incorporated by reference.

The present invention relates to a controlled process of producing an organomineral solid or foamed material, to the material itself and to the use of the material for coal and/or rock consolidation and sealing, soil and brick formation in mining industry, tunneling and construction industry.

In case of coal and/or rock consolidation and sealing, soil and brick formation in mining, tunneling and construction industry, a common practice is to use a resin system based on polyurethane (PUR) or silicates, i.e. materials obtained in the reaction between isocyanate and water glass. However, existing PUR and silicate systems have some drawbacks. For example, in the case of PUR, a highly exothermic reaction occurs (particularly if water is present), which in specific conditions, might cause fire. On the other hand, low-temperature silicate systems, which are not sensitive to water, are limited by the foaming factor. An advantage of silicate-based materials is their low flammability. A comparison between PUR and silicate systems is presented in Table 1.

TABLE 1

Comparison between PUR and silicate systems.

| | Polyurethanes | Silicate |
|---|---|---|
| Controlled foaming | YES | NO |
| Sensitivity to water | YES | NO |
| Reaction temperature | HIGH | LOW |
| Fire properties | Flame retardants are needed | No flame retardants are needed |

Developing a silicate system with a smoothly controlled foaming factor, which is not dependent on the mixing conditions, is difficult. This is due to the nature of water glass as it is possible for carbon dioxide generated in the process of foaming to react with water glass.

Favourable fire properties and low reaction temperature of PUR can be obtained by using fillers. Filled polyurethane materials are known. Disadvantages of such a system include that the viscosity of the polyol part increases significantly, which also results in high viscosity of the reaction mixture.

In order to obtain an injection material with low reaction temperature and favorable fire properties, a water suspension of flame retarders with significantly low viscosity could be used.

For example, U.S. Pat. No. 3,897,372 describes a composition of polyisocyanate and water suspension of flame retarders. The obtained polyurethane compositions have improved flame properties. The composition includes a hydrophilic polyurethane with alumina hydrate, melamine, boric acid and silica uniformly disposed throughout. In U.S. Pat. No. 4,066,578 a similar composition upgraded with suspending agents was described. U.S. Pat. No. 4,237,182 presents sprayable mixture of reactants that produce fire-resisting foam, which works as a coating for sealing the interior mine surface in general. The coating is made of fire-resistant polyurethane foam prepared by reacting a hydrophilic, polyoxyalkylene based isocyanate prepolymer with water suspension of a large amount of alumina trihydrate, a phosphorus fire-retardant, aliphatic alcohol or phenols having at least two hydroxyl groups per mole and optionally a surfactant/suspending agent. The prepolymer and the water slurry were sprayed in a volume ratio of 1:2. As a result, foamed materials with densities within the range of 200 to 480 kg/m$^3$ and a very high value of oxygen index were obtained. However, the reaction times are not disclosed and for the reaction to work, the isocyanate has to be heated up to 55° C. and high pressure equipment is required.

It is known from U.S. Pat. No. 4,105,594 to produce polyurea foams of water insoluble polyisocyanate, free from ionic groups and water suspension. Highly filled hydrophobic, hard polyurea foam with densities from 10 to 100 kg/m$^3$ are produced. Foams of this type are readily produced by mixing polyisocyanate with water and an inorganic filler. Many different inorganic materials suspended in water have been used to fill foams of this kind, e.g. chalk, barium sulphate, kaolin. The preferably used filler suspension has viscosity values within the range of 100 to 10000 mPas with as high as possible filler content (50 to 70% by weight) in order not to bring in more water than it is absolutely necessary into the foam (all the water should react with NCO group). Isocyanates with viscosity ranging from 400 to 12000 mPas at 25° C. were used. What is interesting, the low-viscosity polyisocyanate does not give good results. Usually blowing agents are used (trichlorofluoromethane), however, four examples without use of blowing agents are described. The limitations of this process are: impossibility to control foaming factors and relatively high viscosities of the reacting mixture.

Amelioration of the above identified problems has been sought.

According to the invention there is provided a two-part composition suitable for use in the preparation of a foamed material wherein the first part comprises a source of metal ions and water and the second part comprises an isocyanate.

According to the invention there is provided a two-part composition suitable for use in the preparation of a foamed material wherein the first part comprises a source of metal ions and water and the second part comprises an isocyanate, wherein the ratio of NCO isocyanate to water to metal ions is 1 mol:3.5 to 5.5 mol:95 to 650 mmol.

According to the invention there is also provided a foamed isocyanate material comprising metal ions.

According to the invention there is further provided a method of preparing a foamed isocyanate material which method comprises the steps of:
a) providing a first part comprising a source of metal ions and water;
b) providing a second part comprising an isocyanate; and
c) mixing the first part with the second part to form the foamed isocyanate material.

According to the invention there is also provided a method of controlling the foaming factor in the formation of a foamed isocyanate material which method comprises the steps of:
a) providing a first part comprising a source of metal ions and water and a second part comprising an isocyanate;
b) selecting a concentration of metal ions in the first part to provide a desired foaming factor; and
c) mixing the first part with the second part to form the foamed isocyanate material.

According to the invention there is also provided a method of controlling the foaming factor in the formation of a foamed isocyanate material which method comprises the steps of:
a) providing a first part comprising a source of metal ions and water and a second part comprising an isocyanate;
b) selecting a concentration of one or more metal ions and water in the first part, and alternatively or in addition selecting the concentration of the isocyanate in the second part, to provide a desired foaming factor; and
c) mixing the first part with the second part to form the foamed isocyanate material.

According to the invention there is further provided a two-component system wherein the first part consists of water and a source of metal ions optionally with one or more additives selected from the group of additives consisting of an inorganic filler, an organic flame retarder, a surface active compound, an amine, and a gelling agent; and the second part consists of an isocyanate optionally with one or more additives selected from the group of additives consisting of a plasticizer and a surface active compound.

According to the invention there is also provided a method of consolidating a ground formation in construction, a tunnel or a mine which method comprises the steps of:

a) supplying providing a first part comprising a source of metal ions and water and a second part comprising an isocyanate to the ground formation in need of consolidation; and b) mixing the first part with the second part to form a foamed isocyanate material to consolidate the ground formation.

Advantages of the invention include that it has surprisingly been found possible to obtain an organomineral material with a fully controllable process of foaming by controlling the concentration of metal ions without the use of a blowing agent, that the material is surprisingly insensitive to water and that the material is surprisingly formed at a low reaction temperature and has fire retarding properties. A further advantage is that the method of preparing the foamed material is suitable for use in coal and/or rock consolidation and sealing as well as soil and brick formation in the mining, tunneling and construction industry.

In some embodiments, an inorganic and/or an organic salt may be used as a source of metal ions. In some embodiments, the second part may comprise a source of metal ions, for example in the form of a surfactant. It will be understood that an inorganic salt has an inorganic anion and an organic salt has an organic anion. In some embodiments, the anion of the source of metal ions may be a soft anion as defined by HSAB theory where a faster reaction rate and/or better miscibility is needed. In some embodiments, the anion of the source of metal ions may be a hard anion as defined by HSAB theory where a slower reaction rate is acceptable and/or where miscibility is not important. Examples of suitable soft anions include: phosphate, bromide, pyrophosphate. Examples of suitable hard anions include: chloride, carboxylate, nitrate.

Generally suitable organic and/or inorganic salts include any water soluble alkali metal salt and/or alkaline earth metal salt, particularly a water soluble lithium, sodium, potassium and/or magnesium salt. In particular, a potassium salt of phosphate, polyphosphate, bicarbonate, silicate, carbonate, chloride, sulfate, and/or nitrate could be used. Alternatively or in addition, a sodium salt of bicarbonate, carbonate, sulfate, silicate chloride and/or nitrite could be used. In some embodiments, a potassium and/or sodium salt of phosphate, carbonate, bicarbonate and/or silicate could be used. A suitable organic salt includes an alkali metal carboxylate and/or dicarboxylate salt wherein the alkali metal is especially potassium and/or sodium. Other suitable organic salts containing metal ions include crown ethers, alkoxides or sulfonates. A suitable amount of the source of metal ions can be determined by a person of skill in the art depending upon the foaming factor required. In some embodiments, from 0.0001, for example from 0.001 or from 0.01 or from 0.1 or from 1 to 600 mmol, for example to 550 mmol, or to 500 mmol, or to 450 mmol or to 400 mmol of the metal ion may be used per mol of NCO in the isocyanate. A skilled person would be able to determine suitable minimum and maximum amounts of the source of metal ions based on trial and error and the nature of the salt and the other additives to the composition or system of the invention.

In some embodiments, from 0.0001, for example from 0.001 or from 0.01 or from 0.1 or from 1, or from 10 or from 100 to 650 mmol, for example to 600, for example to 550 mmol, or to 500 mmol, or to 450 mmol or to 420 mmol or to 400 mmol of the metal ion may be used per mol of NCO in the isocyanate. A skilled person would be able to determine suitable minimum and maximum amounts of the source of metal ions based on trial and error and the nature of the salt and the other additives to the composition or system of the invention.

In some embodiments from 90 or 95 to 650 mmol, for example 90 mmol to 450 mmol, for example 95 mmol to 430 mmol or for example 100 mmol to 420 mmol of the metal ion may be used per mol of NCO in the isocyanate.

In relation to this invention NCO of isocyanate is defined as the percent by weight of isocyanate groups (NCO) present in the component. In the invention the percent of isocyanate groups is recalculated into mol.

Generally, any known isocyanate may be used in the invention. For example suitable polyisocyanates include 2,2'-, 2,4'- and/or 4,4'-diphenylmethane diisocyanate (MDI), a distillation residue from production of MDI (for example, an isocyanate with functionality higher than 2.7), naphthalene diisocyanate (NDI), 1,4-cyclohexane diisocyanate (CHDI), 2,4- and/or 2,6-toluene diisocyanate (TDI), 4,4'-dicyclohexylmethane diisocyanate ($H_{12}$MDI), hexamethylene diisocyanate (HMDI) and/or p-phenylene diisocyanate (PPDI). In some embodiments, the isocyanate may contain in its structure a urethane group, urea group, biuret group and/or the like.

In some embodiments, the isocyanate may be a MDI grade of isocyanate, particularly polymeric MDI (PMDI). For example, the isocyanate may be diphenylmethane diisocyanate. In some embodiments, the content of the —NCO groups may be in the range of from 5.0, for example from 15 to 33% by weight, optionally with —NCO functionality of at least about 2.

In some embodiments, at least a part of the polyisocyanate may be first reacted with a compound having an —OH and/or —NH groups in order to form a polyisocyanate prepolymer. It should be understood that a polyisocyanate prepolymer may be an isocyanate-terminated polymer or quasi-prepolymer comprising a reaction product of any known MDI-grade of PMDI with a compound which possesses an active hydrogen. In some embodiments, the compound which possesses an active hydrogen may have an —OH functionality of at least about 2. In some embodiments, the polyisocyanate prepolymer may be a polymeric isocyanate having an —NCO functionality of at least about 2.

In some embodiments from 3.5 for example from 4, for example from 4.5 or from 4.7 to 6 mol, for example to 5.5 mol or to 5.2 mol of water may be used per mol of NCO in the isocyanate. In some embodiments 4.9 mol water may be used per mol of NCO in the isocyanate.

In one embodiment the ratio of NCO isocyanate to water to metal ions is 1 mol:3.5:5.5 mol:95 to 650 mmol, for example 1 mol:4.5 to 5.5 mol:95 to 430 mmol, for example 1 mol:4.9 mol:100 to 420 mmol.

In some embodiments, the first part may comprise a flame retarder. In some embodiments, the flame retarder may be an organic flame retarder, particularly a flame retarder with a dilution of gas phase function and/or a gas phase radical quenching mechanism. The organic flame retarders may include the following: melamine and its condensates (melem, melam and melon), melamine cyanurate, urea, mono pentaerythritol, triethyl phosphate (TEP), decabromodiphenyl oxide, hexabromocyclododecane or mixtures thereof. In some embodiments, melamine and its condensates (melem, melam and melon), melamine cyanurate, decabromodiphenyl oxide are used as the organic flame retarder. A suitable amount of the flame retarder can be determined by a person of skill in the art. In particular, the amount and type of the flame retarder can be determined by the desired value of the oxygen index, one or more parameters (such as fire growth rate (FIGRA) and/or smoke growth rate (SMOGRA)) obtained from a cone calorimeter and/or the density of the flame retarder (particularly where a 1:1 volume ratio between the first and second parts of the composition or system according to the invention is desired for ease of administration).

In some embodiments, the first part may comprise an inorganic filler to stabilize the water suspension of the organic flame retarder. In particular, the inorganic filler may be an inert inorganic filler. Stabilization of water suspension of organic flame retarders may be also performed with use of an organic compound. However, there is a cost advantage for using an inorganic filler. A further advantage of using an inorganic filler is that they can optionally act as a flame retardant, for example as intumescent additive by creating a thermal insulation barrier between the burning and unburned parts. Examples of suitable inorganic fillers include alumina, aluminum hydroxide, ammonium polyphosphate coated with melamine, zinc borate, barites, silica, mica, perlite, calcium carbonate, antimony oxide and/or dolomite. In some embodiments, the inorganic filler is alumina, aluminum hydroxide and/or dolomite. A suitable amount of the inorganic filler can be determined by a person of skill in the art. In particular, a skilled person would understand that the amount of the inorganic filler is determined by the stability of the water suspension of organic flame retarder and the inorganic filler. Additionally, the amount and type of inorganic filler can also be determined by the desired value of the oxygen index, one or more parameters (such as fire growth rate (FIGRA) and/or smoke growth rate (SMOGRA)) obtained from a cone calorimeter and/or the density of the flame retarder (particularly where a 1:1 volume ratio between the first and second parts of the composition or system according to the invention is desired for ease of administration).

In some embodiments, the first part, and optionally the second part may comprise a tertiary amine to catalyze the foaming reaction. A suitable tertiary amine is a tertiary aliphatic and/or aromatic amine and their ethers. Examples of suitable tertiary amines include a triethylamine, tributylamine, N-methyl morpholine, 2,2'-dimorpholinyldiethyl ether, triethylenediamine, 1,4-diaza-bicyclo[2.2.2]octane, bis(dimethylaminoethyl) ether, N,N',N''-tris(3-dimethylaminopropyl)hexahydro-s-triazine, tetramethylhexamethylenediamine, triethylenediamine, tetramethylethylenediamine, dimethylbenzylamine, 1-[2-(dimethylamino)ethyl]-4-methylpiperazine, 2-methyl imidazole, pentamethyldipropylenetriamine, 1,2-dimethylimidazole, N,N-dimethylaminocyclohexane, 2,4,6-tris(dimethylaminomethyl)phenol and/or 1,1,4,7,7-pentamethyl-diethylenetriamine. It is particularly preferred to use a tertiary amine which contains a group which can react with isocyanate, for example dimethylaminoethanol, 2-[2-(dimethylamino)ethoxy]ethanol, dimethylaminopropyldipropanolamine, tetramethylaminobispropylamine, triethanoloamine and/or N,N,N'-trimethylaminopropylethanolamine. A suitable amount of the tertiary amine catalyst can be determined by a person of skill in the art depending upon the foaming factor required. In some embodiments, the tertiary amine catalyst may generally be added in an amount of from 0.001 to 10% by weight, particularly from 0.5 to 7% by weight.

In some embodiments, the first part may comprise a gelling agent. The advantages of using a gelling agent include increasing the early viscosity of the mixture of the first and second parts and accelerating reaction rate (or curing). In some embodiments, a water soluble gelling agent may be used though a water insoluble gelling agent could also be used. Examples of suitable gelling agents include 3,5-dimethylthio-2,4-toluenediamine, 3,5-dimethylthio-2,6-toluenediamine, 3,5-diethyltoluene-2,4-diamine, 3,5-diethyltoluene-2,6-diamine, bis(aminoethyl)ether, triethyleneglycol diamine, and/or a polyether amine based predominantly on PEG backbone of general formula (I):

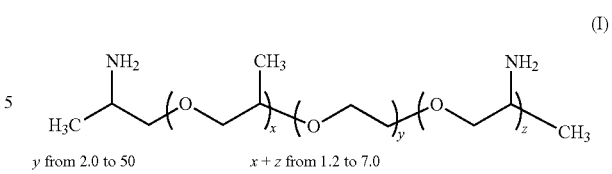

(I)

$y$ from 2.0 to 50    $x + z$ from 1.2 to 7.0

In some embodiments, the second part comprises a plasticizer. It will be understood that a plasticizer is material which improves miscibility of components and provides plastic properties and improved homogeneity of the cured material. The type, amount and structure of plasticizer may influence the density (foaming factor) of the cured material. The amount and/or type of the plasticizer can be selected depending upon how the composition is to be used. In some cases a plasticizer can act as a flame retardant. For example, plasticizers increasing foaming factor may be as follows: triethyl phosphate (TEP), tris(2-chloropropyl) phosphate (TCPP), tris(2-carboxyethyl)phosphine (TCEP), tris(1,3-dichloro-2-propyl) phosphate (TDCPP), cyclic phosphate ester, 2,2,4-trimethyl-1,3-pentanediol diisobutyrate and butyl diglycolacetate (BDGA) and the like. Examples of plasticizers which decreases foaming factor include: carboxylic acid ester, fatty acid ester, aliphatic ester of dicarboxylic acid, rapeseed methyl ester (RME), aliphatic esters of 1,2-cyclohexane dicarboxylic acid, phthalate esters and the like.

In some embodiments, the second part may comprise a surface active compound. A surface active compound may improve the miscibility of components, increase the homogeneity of cured material and/or improve compressive strength. A surface active compound may also cases improve stability of the water suspension. In some embodiments, the surface active compound may be a nonionic, ionic and/or siloxane surfactant. Examples of suitable nonionic surfactants include an alkylphenol ethoxylate, alcohol and fatty alcohol ethoxylate and/or castor oil ethoxylate, for example a castor oil ethoxylate with ethyleneoxy unit (EO) in the range of from 5 to 200, for example from 5 to 20. Examples of ionic surfactants include an alkylbenzene sulphonate, alcohol sulphate, alcohol ether sulphate, alkylammonium salt and/or carboxylic acid salt, for example a sodium and/or potassium salt. Such a salt may provide a further source of metal ions. Examples of siloxane surfactants include compounds which contain a methylated siloxane moiety (a hydrophobic part) and a low molecular weight polymer of ethylene and/or propylene oxide (a hydrophilic part). A skilled person would be able to determine a suitable amount of surface active compound dependent on the desired characteristics. In some embodiments, the surface active compound may generally be added in an amount of from 0 to 5% by weight, particularly from 0.5 to 2% by weight.

In some embodiments, the percentages of ingredients or additives in the first part may be the following:
Inorganic filler: from 0 to 40% by weight, for example from 0 to 30% by weight;
Organic flame retarder: from 10 to 60% by weight, for example from 30 to 50% by weight;
Inorganic and/or organic salt: from 0 to 30% by weight, for example from 0 to 25% by weight;
Catalyst: from 0 to 10% by weight, for example from 0 to 2% by weight;
Gelling agent: from 0 to 10% by weight, for example from 0 to 2% by weight;
Surface active compound: from 0 to 10% by weight, for example from 0 to 2% by weight; wherein the remainder of the first part comprises water.

In some embodiments, the percentages of ingredients or additives in the second part may be the following:
Isocyanate: from 20 to 100% by weight, for example from 65 to 100% by weight;

Plasticizer: from 0 to 80% by weight, for example from 0 to 25% by weight;

Surface active compound: from 0 to 10% by weight, for example from 0-3% by weight.

For the avoidance of doubt, it should be understood that the sum of the percentages of each component in each part should be 100% and that in the first part, the balance is water and in the second part, the balance may be isocyanate.

In some embodiments, when the first and second parts are mixed, a water-in-oil (W/O) emulsion is formed. Without wishing to be limited to a particular theory, it is speculated that during curing, two main reactions occur (in parallel and/or competitively) which are dimer and/or trimer formation and isocyanate hydrolysis.

Isocyanate hydrolysis occurs as a reaction between the isocyanate and water. The hydrolysis results in the formation of carbon dioxide which acts as a blowing agent, increasing the foaming factor. It is believed that dimers and trimers are formed from a NCO group in the presence of a source of metal ions. The reactions forming the dimers and trimers are mainly responsible for material curing. It has been found according to the invention that increasing the concentration of metal ions decreases foaming factor as the curing reaction is promoted to the detriment of the hydrolysis reaction.

In some embodiments inclusion of an additional blowing agent is excluded. By an additional blowing agent is meant a component added over and above the carbon dioxide produced by the hydrolysis reaction between the isocyanate and water It is believed that the presence of a tertiary amine causes the amine to act as a catalyst which leads to a highly exothermic isocyanate hydrolysis, as a result amine and carbon dioxide are created. The produced carbon dioxide is used as a blowing agent. Increasing the concentration of catalyst (amine) increases foaming factor and reaction rate. By modifying the concentrations and ratio of metal ions and tertiary amines, the desirable foaming factor can be achieved, even in huge excess of water.

It is a frequent fact that in case of two-component systems, the foaming factor depends on mixing condition, i.e. increase of mixing efficiency decreases the foaming factor. Similar behavior was observed in present invention, however its influence is moderate and, importantly, the results of the reaction are repeatable.

In some embodiments, the volume ratio of the first part to the second part can be smoothly varied in the range of from 1-4 to from 4-1. For example, suitable volume ratios include 4:1, 2:1, 1:1, 1:2 and 1:4. In some embodiments, the volume ratio is about 1:1 for ease of pumping of the two parts in a mine environment. Compositions with suitable viscosity (depending on the type of application) are processable with help of typical equipment applied in coal and/or rock consolidation and sealing soil and brick formation in mining, tunneling and construction.

In some embodiments the following compounds one, some or all of the following are not present in the first part or are not present in the second part or are not present in either of the first or second parts:

a) compounds having —OH groups with the —OH functionality of at least 2 (except for water), for example
i) low molecular weight polyalcohols such as ethylene glycol, propylene glycol, glycerol, butanediol, sorbitol, triethanolamine, ethanolamine, etc,
ii) reaction products of alkylene oxide (ethylene oxide and/or propylene oxide) with polyalcohol starters. Suitable starters include: ethylene glycol, propylene glycol, glycerol, butanediol, sorbitol, triethanolamine, ethanolamine, etc,
iii) reaction products obtained by the condensation of glycols and polyols with polycarboxylic acids,
iv) other suitable hydroxyl terminated compounds, i.e. polyamides, polyesteramides, polycarbonates, polythioethers, polyolefines, polyacetals;

b) compounds having —NH groups with the —NH functionality of at least 2, for example i) —NH terminated polyols, polyamides, polyesteramides, polycarbonates, polythioethers, polyolefines, polyacetals, polyesters; and c) water glass i.e. water solution of sodium and/or potassium silicate.

It has surprisingly been found that foamed isocyanate materials according to the present invention have very good flame retarding properties and a low curing temperature. For example, for a foamed material with density 350 kg/m$^3$, the oxygen index value was 28 (according to ISO 4589-2) and the highest category (VO) was achieved in vertical burning test according to EN 60695-11-10. The reaction temperature was lower than 90° C.

The following examples are provided for the purpose of illustrating the invention and are not intended to limit the scope of the invention claimed. In the Examples, start time refers to the beginning of the visible foaming process. The temperature of the reacting mixture was measured in the core of the sample. All experiments and measurements were carried out at 25° C.

PREPARATIVE EXAMPLE A

In the following preparative example, first parts A1, A2, A3 and A4 were prepared as follows.

The aqueous solutions were prepared by mixing the indicated amounts of each ingredient until all salt was dissolved. The obtained solution was stored for 24 hours at 25° C. before use. Aqueous suspensions (A1-A4) were prepared by mixing the indicated amounts of ingredients for 10 minutes at 2000 RPM (disc diameter 40 mm) with a high shear mixer. The obtained mixture was used immediately after preparing.

A1: 53.6 g of water, 9.5 g of potassium carbonate, 30 g of lime stone, 15 g of magnesium hydroxide and 0.1 g of 2,4,6-tris(dimethylaminomethyl)phenol were mixed together as described above. Suspension parameters: viscosity 18 mPas at 365 1/s, density 1.48 g/cm$^3$.

A2: 53.6 g of water, 9.5 g of potassium carbonate, 30 g of lime stone, 15 g of magnesium hydroxide, 0.1 g of 2,4,6-tris(dimethylaminomethyl)phenol and 0.5 g of EMULGANTE EL—30 (oxethylated castor oil EO=30) were mixed together as described above. Suspension parameters: viscosity 17 mPas at 365 1/s, density 1.48 g/cm$^3$.

A3: 53.6 g of water, 9.5 g of potassium carbonate, 30 g of lime stone, 15 g of magnesium hydroxide, 0.1 g of 2,4,6-tris(dimethylaminomethyl)phenol and 1.5 g of EMULGANTE EL—30 (oxethylated castor oil EO=30) were mixed together as described above. Suspension parameters: viscosity 17 mPas at 365 1/s, density 1.48 g/cm$^3$.

A4: 53.6 g of water, 9.5 g of potassium carbonate, 30 g of lime stone, 15 g of magnesium hydroxide, 0.1 g of 2,4,6-tris(dimethylaminomethyl)phenol and 1.5 g of JEFFAMINE ED 600 (product of Huntsman) were mixed together as described above. Suspension parameters: viscosity 18 mPas at 365 1/s, density 1.48 g/cm$^3$.

PREPARATIVE EXAMPLE B

In this preparative example, second parts B1, B2, B3, B4, B5, B6, B7 and B8 which are isocyanate solutions were prepared. Second parts B2, B3, B4, B5, B6, B7 and B8 were prepared by mixing the indicated amounts of each ingredient for 5 minutes.

B1: 85 g of polyether polyol (Voranol CP450, viscosity 350 mPas at 25° C., OH value 383.0 mg/g KOH, product of Dow Chemical) was placed in a round-bottomed flask equipped with a stirrer and purged with nitrogen (10 minutes), then 830 g of standard polymeric MDI was added (Voronate M220, viscosity 215 mPas at 25° C., NCO value 30.8%, product of Dow Chemical) and the obtained mixture was stored for 72 hours at 40° C. Prepolymer parameters: —NCO content 25.4, viscosity 8880 mPas, density 1.23.

B2: 90 g of mixture B1 was mixed with 10 g of triethyl phosphate (TEP) and the obtained mixture was stored for 72 hours at 25° C. Mixture parameters: —NCO content 23.0, viscosity 1530 mPas, density 1.20 g/cm$^3$.

B3: 90 g of mixture B1 was mixed with 10 g of rapeseed methyl ester (RME) and the obtained mixture was stored for 72 hours at 25° C. Mixture parameters: —NCO content 22.9, viscosity 1640 mPas, density 1.20 g/cm$^3$.

B4: 90 g of mixture B1 was mixed with 10 g of 2,2,4-trimethyl-1,3-pentanediol diisobutyrate and the obtained mixture was stored for 72 hours at 25° C. Mixture parameters: —NCO content 23.0, viscosity 2580 mPas, density 1.20 g/cm$^3$.

B5: 90 g of mixture B1 was mixed with 10 g of bis(2-ethylhexyl)-1,4-benzenedicarboxylate and the obtained mixture was stored for 72 hours at 25° C. Mixture parameters: —NCO content 23.1, viscosity 4120 mPas, density 1.20 g/cm$^3$.

B6: 80 g of mixture B1 was mixed with 20 g of bis(2-ethylhexyl)-1,4-benzenedicarboxylate and the obtained mixture was stored for 72 hours at 25° C. Mixture parameters: —NCO content 25.4, viscosity 2225 mPas, density 1.20 g/cm$^3$.

B7: 100 g of mixture B1 was mixed with 0.5 g of DABCO 5160 (product of Air Products) and the obtained mixture was stored for 72 hours at 25° C. Mixture parameters: —NCO content 25.4, viscosity 8990 mPas, density 1.23 g/cm$^3$.

B8: 100 g of mixture B1 was mixed with 1.5 g of DABCO 5160 (product of Air Products) and the obtained mixture was stored for 72 hours at 25° C. Mixture parameters: —NCO content 23.1, viscosity 8910 mPas, density 1.23 g/cm$^3$.

EXAMPLE 1

In Example 1, the influence of metal ion concentration on foaming factor and reaction rate was investigated.

100 g of mixture B1 was vigorously stirred using a high shear mixer (3000 RPM, 60 seconds, disc diameter 40 mm) with a water solution of potassium carbonate having a concentration indicated in Table 2. In all experiments in Example 1, the molar ratio between isocyanate groups (100 g of mixture B1 contain 25.4 g of NCO which is 0.61 mol of NCO) and water (53.6 g; 2.98 mol) was constant. The influence of potassium ion concentration on the foaming factor and reaction rate was tested. The results presented in Table 2 shows that with increasing the concentration of potassium ion, the density of the cured material and reaction rate increases as well and consequently the foam factor decreases. This is because with higher potassium ion concentration, the reaction start time is quicker and the tack free time is less.

TABLE 2

Influence of potassium ion concentration on density and reaction rate.

| No | Water [g]/ Potassium carbonate [g] | K$^+$ [mmol] | Start time [min] | Tack free time [min] | Density [kg/m$^3$] | Temp. [° C.] |
|---|---|---|---|---|---|---|
| 1 | 53.6/0.0 | 0 | 10 | 120 | —$^{a)}$ | — |
| 2 | 53.6/4.3 | 63 | 40 | 100 | 400 | 70 |
| 3 | 53.6/9.5 | 137 | 30 | 45 | 570 | 70 |
| 4 | 53.6/13.4 | 194 | 10 | 25 | 700 | 71 |
| 5 | 53.6/17.9 | 259 | 8 | 32 | 740 | 75 |
| 6 | 53.6/30.6 | 444 | —$^{b)}$ | — | — | — |

$^{a)}$Material very uneven, brittle. Foam collapse.
$^{b)}$Material again very uneven and brittle. Not mixed.

EXAMPLE 2

In Example 2, the influence of amine concentration on foaming factor and reaction rate was investigated.

100 g of mixture B1 was vigorously stirred using a high shear mixer (3000 RPM, 60 seconds, disc diameter 40 mm) with a water solution of potassium carbonate and an amount of amine indicated in Tables 3 and 4 below.

In all experiments in this Example, the molar ratio between isocyanate groups (100 g of mixture B1 contain 25.4 g of NCO which is 0.61 mol of NCO), water (53.6 g; 2.98 mol) and potassium carbonate (9.5 g of K$_2$CO$_3$; 137 mmol of K$^+$ or 17.9 g of K$_2$CO$_3$; 259 mmol of K$^+$) were constants. Different concentrations of amine were tested. Increasing the concentration of an amine was found to decrease density and to reduce start time and tack free time. Higher densities of cured product maintaining reduced reaction time may be achieved by increasing metal ion concentration as can be seen by comparing the results in Table 3 with those in Table 4.

TABLE 3

Influence of amine concentration on foaming factor and reaction rate (137 mmol of K$^+$).

| No | Water [g]/ Potassium carbonate [g] | K$^+$ [mmol] | Amine [mmol] | Start time [min] | Tack free time [min] | Density [kg/m$^3$] |
|---|---|---|---|---|---|---|
| 7 | 53.6/9.5 | 137 | 0.24 | 15 | 23 | 800 |
| 8 | 53.6/9.5 | 137 | 0.48 | 12 | 19 | 260 |
| 9 | 53.6/9.5 | 137 | 1.20 | 3 | 7 | 210 |
| 10 | 53.6/9.5 | 137 | 2.40 | 3 | 5 | 65 |

Amine - 2,4,6-tris(dimethylaminomethyl)phenol

TABLE 4

Influence of amine concentration on foaming factor and reaction rate (259 mmol of K$^+$).

| No | Water [g]/ Potassium carbonate [g] | K$^+$ [mmol] | Amine [mmol] | Start time [min] | Tack free time [min] | Density [kg/m$^3$] |
|---|---|---|---|---|---|---|
| 11 | 53.6/17.9 | 259 | 0.24 | 3 | 23 | 880 |
| 12 | 53.6/17.9 | 259 | 0.48 | 2 | 13 | 780 |
| 13 | 53.6/17.9 | 259 | 1.20 | 2 | 9 | 740 |
| 14 | 53.6/17.9 | 259 | 2.40 | 2 | 6 | 360 |

Amine - 2,4,6-tris(dimethylaminomethyl)phenol

EXAMPLE 3

In the following example, the influence of salt type on foaming factor and reaction rate was investigated.

100 g of mixture B1 was vigorously stirred using a high shear mixer (3000 RPM, 60 seconds, disc diameter 40 mm) with a water solution of the potassium or sodium salt indicated in Table 5. In all experiments in this Example, the molar ratio between isocyanate groups (100 g of mixture B1 contain 25.4 g of NCO which is 0.61 mol of NCO), water (53.6 g; 2.98 mol), amine (0.1 g; 0.48 mmol) and metal ions (137 mmol) were constants. Different types of potassium and sodium salts were tested. Potassium and sodium cations show similar activity, i.e. almost equal foaming factor, start time and tack free time. On the other hand, strong influence of an anion type on reaction rate and mixing ability of components was found. Hard anions (defined by HSAB theory) were found to decrease reaction rate and reduce miscibility of components (experiments 15, 16, 17, 19, 20, 22 and 24). Results are listed in Table 5.

TABLE 5

Influence of salt type on foaming factor and reaction rate.

| No | Amine | Water [g]/ salt [g] | M+ [mmol] | Amine [mmol] | Start time [min] | Tack free time [min] | Density [kg/m³] |
|---|---|---|---|---|---|---|---|
| 15 | $K_2CO_3$ | 53.6/9.5 | 137 | 0.48 | 12 | 19 | 260 |
| 16 | $CH_3COOK$ | 53.6/13.4 | 137 | 0.48 | 10 | 70 | 90 |
| 17 | NaCl | 53.6/8.0 | 137 | 0.48 | 12 | 139[a] | 95 |
| 18 | $K_3PO_4$ | 53.6/9.7 | 137 | 0.48 | 7 | 22 | 80 |
| 19 | $Na_2CO_3$ | 53.6/7.3 | 137 | 0.48 | 10 | 18 | 240 |
| 20 | $KNO_3$ | 53.6/13.8 | 137 | 0.48 | 11 | 96[a] | 310 |
| 21 | $K_4P_2O_7$ | 53.6/11.3 | 137 | 0.48 | 10 | 30 | 75 |
| 22 | $NaHCO_3$ | 53.6/5.8 | 137 | 0.48 | 5 | 33 | 70 |
| 23 | KBr | 53.6/16.3 | 137 | 0.48 | 12 | —[a][b] | — |
| 24 | $K_3C_6H_5O_7$ | 53.6/14 | 137 | 0.48 | 8 | 90 | 80 |

Amine - 2,4,6-tris(dimethylaminomethyl)phenol
[a] Problems with miscibility of components.
[b] Foam collapse.

EXAMPLE 4

In the following example, the influence of amine type on foaming factor and reaction rate was investigated.

100 g of mixture B1 was vigorously stirred using a high shear mixer (3000 RPM, 60 seconds, disc diameter 40 mm) with a water solution of potassium carbonate and the type of amine indicated in Table 6. In all experiments in this Example, the molar ratio between isocyanate groups (100 g of mixture B1 contain 25.4 g of NCO which is 0.61 mol of NCO), water (53.6 g; 2.98 mol) and potassium carbonate (9.5 g of $K_2CO_3$; 137 mmol of $K^+$) were constants. Different concentrations and different amines were tested. The results show that different amines can be used dependent on the desired final material density and/or reaction times. Results are listed in Table 6.

EXAMPLE 5

In the following example, the influence of inorganic fillers on density and the rheological properties of the reaction mixture was investigated.

81 cm³ (100 g) of mixture B1 was vigorously stirred using a high shear mixer (3000 RPM, 60 seconds, disc diameter 40 mm) with 81 cm³ water suspension containing potassium carbonate, amine and the amount of filler indicated in Table 7. In all experiments in this Example, the molar ratio between isocyanate groups (100 g of mixture B1 contain 25.4 g of NCO which is 0.61 mol of NCO), water (53.6 g; 2.98 mol), potassium carbonate (9.5 g of $K_2CO_3$; 137 mmol of $K^+$) and amine (0.1 g of amine; 0.48 mmol) were constants. The results show that different fillers can be used dependent on the desired final material density. Results are presented in Table 7.

TABLE 6

Influence of amine type on foaming factor and reaction rate.

| No | Amine | Water [g]/ Potassium carbonate [g] | K+ [mmol] | Amine [mmol] | Start time [min] | Tack free time [min] | Density [kg/m³] |
|---|---|---|---|---|---|---|---|
| 25 | 2,4,6-Tris(dimethylaminomethyl)phenol | 53.6/9.5 | 137 | 0.48 | 8 | 10 | 490 |
| 26 | 2-[2-(Dimethylamino)-ethoxy]ethanol | 53.6/9.5 | 137 | 0.48 | 5 | 9 | 190 |
| 27 | 2,2'-Dimorpholino-diethyl ether | 53.6/9.5 | 137 | 0.48 | 6 | 9 | 440 |
| 28 | 1,3,5-Tris(dimethylaminopropyl)hexahydrotriazine | 53.6/9.5 | 137 | 0.48 | 14 | 14 | 830 |
| 29 | Tetramethylamino-bispropylamine | 53.6/9.5 | 137 | 0.48 | 7 | 10 | 440 |
| 30 | (2-Hydroxypropyl)trimethyl ammonium formate | 53.6/9.5 | 137 | 0.48 | 41 | 41 | 850 |
| 31 | Triethanoloamine | 53.6/9.5 | 137 | 0.48 | 37 | 37 | 920 |
| 32 | Tetramethylguanidine | 53.6/9.5 | 137 | 0.48 | 10 | 11 | 630 |
| 33 | Pentamethyldiethylene-triamine | 53.6/9.5 | 137 | 0.48 | 5 | 9 | 330 |

TABLE 7

Influence of filler type on foaming factor and reaction rate.

| No | Filler type | Filler amount [g] | Water [g]/ Potassium carbonate [g] | $K^+$ [mmol] | Amine [mmol] | Start time [min] | Tack free time [min] | Density [kg/m$^3$] | Temp. [° C.] |
|---|---|---|---|---|---|---|---|---|---|
| 34 | Dolomite | 90 | 53.6/9.5 | 137 | 0.48 | 6 | 10 | 200 | 79 |
| 35 | Lime stone | 46 | 53.6/9.5 | 137 | 0.48 | 7 | 10 | 200 | 80 |
| 36 | Lime stone [a] | 23 | 53.6/9.5 | 137 | 0.48 | 5 | 7 | 250 | 80 |
| 37 | Quartz sand | 63 | 53.6/9.5 | 137 | 0.48 | 4 | 8 | 270 | 68 |
| 38 | Kaolin | 40 | 53.6/9.5 | 137 | 0.48 | 5 | 9 | 445 | 82 |
| 39 | Barium sulfate | 104 | 53.6/9.5 | 137 | 0.48 | 5 | 9 | 380 | 81 |

Amine - 2,4,6-tris(dimethylaminomethyl)phenol
[a] Surface-treated, hydrophobic version.

EXAMPLE 6

In the following example, the influence of flame retarders on density, fire and rheological properties was investigated.

81 cm$^3$ (100 g) of mixture B1 was vigorously stirred using a high shear mixer (3000 RPM, 60 seconds, disc diameter 40 mm) with 81 cm$^3$ water suspension containing potassium carbonate, amine and the amount of flame retarder indicated in Table 8. In all experiments molar ratio between isocyanate groups (100 g of mixture B1 contain 25.4 g of NCO which is 0.61 mol of NCO), water (53.6 g; 2.98 mol), potassium carbonate (9.5 g of $K_2CO_3$; 137 mmol of $K^+$) and amine (0.1 g of amine; 0.48 mmol) were constants. The results show that different flame retarders can be used dependent on the desired final material density.

TABLE 8

Influence of flame retarders type on foaming factor and reaction rate.

| No | Flame retarders type | Flame retarders amount [g] | Water [g]/ Potassium carbonate [g] | $K^+$ [mmol] | Amine [mmol] | Start time [min] | Tack free time [min] | Density [kg/m$^3$] | Temp. [° C.] |
|---|---|---|---|---|---|---|---|---|---|
| 40 | Aluminum hydroxide | 55 | 53.6/9.5 | 137 | 0.48 | 5 | 10 | 230 | 80 |
| 41 | Melamine | 40 | 53.6/9.5 | 137 | 0.48 | 7 | 9 | 340 | 76 |
| 42 | Antimony oxide | 80 | 53.6/9.5 | 137 | 0.48 | 4 | 6 | 1180 | 85 |
| 43 | Magnesium hydroxide | 53 | 53.6/9.5 | 137 | 0.48 | 7 | 10 | 600 | 102 |
| 44 | Decabromo-diphenyl oxide | 53 | 53.6/9.5 | 137 | 0.48 | 7 | 10 | 290 | 83 |

Amine - 2,4,6-tris(dimethylaminomethyl)phenol

EXAMPLE 7

In the following example, the influence of plasticizers on density and reaction rate was investigated.

83 cm$^3$ (123 g) of mixture A1 containing potassium carbonate, amine, magnesium hydroxide and lime stone was vigorously stirred using a high shear mixer (3000 RPM, 90 seconds, disc diameter 40 mm) with 83 cm$^3$ isocyanate mixture (B2-B6). In all experiments in this Example, the molar ratio between isocyanate groups (100 g of isocyanate mixture contain 22.9 g of NCO which is 0.55 mol of NCO), water (59.4.6 g; 3.30 mol), potassium carbonate (10.5 g of $K_2CO_3$; 152 mmol of $K^+$) and amine (0.11 g of amine; 0.53 mmol) were constants (unless otherwise stated). The results show that different plasticizer can be used. A more hydrophilic compound like TEP (experiment 46) decreases density of the cured material and reduces reaction times. A hydrophobic compound (experiments 47-50) provides excellent miscibility of components (as a fine emulsion is created) but increases the reaction rate. Results are listed in Table 9.

TABLE 9

Influence of plasticizer on foaming factor and reaction rate.

| No | A + B | Water [g]/ Potassium carbonate [g] | $K^+$ [mmol] | Amine [mmol] | Start time [min] | Tack free time [min] | Density [kg/m$^3$] | Temp. [° C.] |
|---|---|---|---|---|---|---|---|---|
| 45[a] | A1 + B1 | 59.4/10.5 | 152 | 0.53 | 5 | 7 | 595 | 99 |
| 46 | A1 + B2 | 59.4/10.5 | 152 | 0.53 | 2 | 7 | 240 | 90 |
| 47 | A1 + B3 | 59.4/10.5 | 152 | 0.53 | 14 | 15 | 800 | 99 |
| 48 | A1 + B4 | 59.4/10.5 | 152 | 0.53 | 16 | 16 | 740 | 96 |

TABLE 9-continued

Influence of plasticizer on foaming factor and reaction rate.

| No | A + B | Water [g]/ Potassium carbonate [g] | K+ [mmol] | Amine [mmol] | Start time [min] | Tack free time [min] | Density [kg/m$^3$] | Temp. [° C.] |
|---|---|---|---|---|---|---|---|---|
| 49 | A1 + B5 | 59.4/10.5 | 152 | 0.53 | 11 | 11 | 740 | 100 |
| 50[b)] | A1 + B6 | 59.4/10.5 | 152 | 0.53 | 18 | 18 | 810 | 82 |

Amine - 2,4,6-tris(dimethylaminomethyl)phenol
[a)]73 cm$^3$ of component B1 was used due to keep molar ratios of ingredients.
[b)]100 g of mixture B6 contain 20.4 g of NCO which is 0.48 mol of NCO.

EXAMPLE 8

In this example, the influence of the surface active compound on foaming factor and reaction rate was investigated.

81 cm$^3$ (123 g) of water suspension containing potassium carbonate, amine, magnesium hydroxide, lime stone and eventually surface active compound (mixtures A1, A2) was vigorously stirred using a high shear mixer (3000 RPM, 70 seconds, disc diameter 40 mm) with 81 cm$^3$ of isocyanate mixture (B7-B8). In all experiments in this Example, the molar ratio between isocyanate groups (100 g of isocyanate mixture contain 25.4 g of NCO which is 0.61 mol of NCO), water (59.4 g; 3.30 mol), potassium carbonate (10.5 g of K$_2$CO$_3$; 152 mmol of K$^+$) and amine (0.11 g of amine; 0.53 mmol) were constants. For experiments 52 and 53, siloxane surfactants was used, distributed in component B. For experiments 54 and 55, castor oil ethoxylate was used, distributed in component A. Obtained samples were found to possess excellent structure and smooth surface. Moreover, in all cases, the surface active compound was observed to decrease reaction start time and tack free time. Results are presented in Table 10.

EXAMPLE 9

In the following example, the influence of gelling agent on foaming factor and reaction rate was investigated.

83 cm$^3$ (123 g) of water suspension containing potassium carbonate, amine, magnesium hydroxide, lime stone and a polyether amine based predominantly on PEG backbone, i.e. JEFFAMINE ED 600, product of Huntsman, (mixture A4) was vigorously stirred using a high shear mixer (3000 RPM, 70 seconds, disc diameter 40 mm) with 83 cm$^3$ of isocyanate mixture (B1). Molar ratio between isocyanate groups (100 g of isocyanate mixture contain 25.4 g of NCO which is 0.61 mol of NCO), water (59.4 g; 3.30 mol), potassium carbonate (10.5 g of K$_2$CO$_3$; 152 mmol of K$^+$) and amine (0.11 g of amine; 0.53 mmol) were constants in this Example. The result obtained is presented in Table 11. From a comparison with experiment 51 from Table 10, it can be seen that the gelling agent decreases the start time of the reaction and increases reaction rate but also increases density and the reaction temperature.

TABLE 10

Influence of surface active compound on foaming factor and reaction rate.

| No | A + B | Water [g]/ Potassium carbonate [g] | K+ [mmol] | Amine [mmol] | Start time [min] | Tack free time [min] | Density [kg/m$^3$] | Temp. [° C.] |
|---|---|---|---|---|---|---|---|---|
| 51 | A1 + B1 | 59.4/10.5 | 152 | 0.53 | 7 | 8 | 530 | 98 |
| 52 | A1 + B7 | 59.4/10.5 | 152 | 0.53 | 4 | 5 | 450 | 100 |
| 53 | A1 + B8 | 59.4/10.5 | 152 | 0.53 | 2 | 3 | 450 | 99 |
| 54 | A2 + B1 | 59.4/10.5 | 152 | 0.53 | 4 | 5 | 490 | 99 |
| 55 | A3 + B1 | 59.4/10.5 | 152 | 0.53 | 3 | 4 | 500 | 100 |
| 56[a)] | A4 + B1 | 59.4/10.5 | 152 | 0.53 | 4 | 5 | 480 | 100 |

Amine - 2,4,6-tris(dimethylaminomethyl)phenol

TABLE 11

Influence of gelling agent on foaming factor and reaction rate.

| No | A + B | Water [g]/ Potassium carbonate [g] | K+ [mmol] | Amine [mmol] | Start time [min] | Tack free time [min] | Density [kg/m$^3$] | Temp. [° C.] |
|---|---|---|---|---|---|---|---|---|
| 51* | A1 + B1 | 59.4/10.5 | 152 | 0.53 | 7 | 8 | 530 | 98 |
| 56 | A4 + B1 | 59.4/10.5 | 152 | 0.53 | 5 | 6 | 850 | 102 |

Amine - 2,4,6-tris(dimethylaminomethyl)phenol
*Data from the Table 10

The invention claimed is:

1. A two-part composition comprising first and second parts which form a foamed isocyanate material when mixed, wherein
the first part comprises a source of metal ions and water and the second part comprises an isocyanate, and wherein
the composition has a ratio of NCO in the isocyanate to water to metal ions of 1 mol:3.5 to 5.5 mol:95 to 650 mmol, and wherein
the source of metal ions is a water soluble metal salt selected from the group consisting of phosphate, bromide, pyrophosphate, polyphosphate, bicarbonate, carbonate, chloride, sulfate, nitrate, nitrite, and mixtures of two or more of such salts, and wherein
the first and second parts do not contain a polyalcohol and form the foamed isocyanate material when mixed by hydrolysis of the isocyanate in the second part.

2. The two-part composition as defined in claim 1, wherein the metal is an alkali metal or an alkaline earth metal.

3. The two-part composition as defined in claim 2, wherein the metal is selected from the group consisting of lithium, sodium, potassium and magnesium.

4. The two-part composition as defined in claim 3, wherein the water soluble metal salt is selected from the group consisting of potassium phosphate, potassium polyphosphate, potassium bicarbonate, potassium carbonate, potassium chloride, potassium sulfate, potassium nitrate, sodium bicarbonate, sodium carbonate, sodium sulfate, sodium chloride and/or sodium nitrite.

5. The two-part composition as defined in claim 1, wherein the composition comprises from 95 to 450 mmol of the metal ion per mol of NCO in the isocyanate.

6. The two-part composition as defined in claim 1, wherein the ratio of NCO in the isocyanate to water to metal ions is 1 mol:4.5 to 5.5 mol:95 to 450 mmol.

7. The two-part composition as defined in claim 1, wherein the content of —NCO groups is from 5.0 to 33% by weight with —NCO functionality of at least about 2.

8. The two-part composition as defined in claim 1, wherein the isocyanate is a polyisocyanate and/or a polyisocyanate prepolymer.

9. The two-part composition as defined in claim 1, wherein the first part comprises at least one further component selected from the group consisting of a flame retarder, an inorganic filler and a gelling agent.

10. The two-part composition as defined in claim 1, wherein the first part and optionally the second part comprises a tertiary amine.

11. The two-part composition as defined in claim 1, wherein the second part comprises a plasticizer and/or a surface active compound.

12. The two-part composition as defined in claim 1, wherein the volume ratio of the first part to the second part is from 1:4 to 4:1.

13. A method of preparing a foamed isocyanate material which method comprises the steps of:
a) providing a first part comprising a source of metal ions and water, wherein the source of metal ions is a water soluble metal salt selected from the group consisting of phosphate, bromide, pyrophosphate, polyphosphate, bicarbonate, carbonate, chloride, sulfate, nitrate, nitrite, and mixtures of two or more of such salts;
b) providing a second part comprising an isocyanate; and
c) mixing the first part with the second part in the absence of a polyalcohol to form the foamed isocyanate material by hydrolysis of the isocyanate in the second part.

14. A method of controlling the foaming factor in the formation of a foamed isocyanate material which method comprises the steps of:
a) providing a first part comprising a source of metal ions and water and a second part comprising an isocyanate, wherein the source of metal ions is a water soluble metal salt selected from the group consisting of phosphate, bromide, pyrophosphate, polyphosphate, bicarbonate, carbonate, chloride, sulfate, nitrate, nitrite, and mixtures of two or more of such salts;
b) selecting a concentration of metal ions in the first part to provide a desired foaming factor; and
c) mixing the first part with the second part in the absence of a polyalcohol to form the foamed isocyanate material by hydrolysis of the isocyanate in the second part.

15. A method of controlling the foaming factor in the formation of a foamed isocyanate material which method comprises the steps of:
a) providing a first part comprising a source of metal ions and water and a second part comprising an isocyanate, wherein the source of metal ions is a water soluble metal salt selected from the group consisting of phosphate, bromide, pyrophosphate, polyphosphate, bicarbonate, carbonate, chloride, sulfate, nitrate, nitrite, and mixtures of two or more of such salts;
b) selecting a concentration of one or more of metal ions and water in the first part, and alternatively or in addition selecting the concentration of the isocyanate in the second part, to provide a desired foaming factor; and
c) mixing the first part with the second part in the absence of a polyalcohol to form the foamed isocyanate material by hydrolysis of the isocyanate in the second part.

16. A method of consolidating and/or sealing a ground formation in construction, a tunnel or a mine which method comprises the steps of:
a) supplying providing a first part comprising a source of metal ions and water and a second part comprising an isocyanate to the ground formation in need of consolidation and/or sealing, wherein the source of metal ions is a water soluble metal salt selected from the group consisting of phosphate, bromide, pyrophosphate, polyphosphate, bicarbonate, carbonate, chloride, sulfate, nitrate, nitrite, and mixtures of two or more of such salts; and
b) mixing the first part with the second part in the absence of a polyalcohol to form a foamed isocyanate material by hydrolysis of the isocyanate in the second part to consolidate and/or seal the ground formation.

17. A two-component system comprising first and second parts which form a foamed isocyanate material when mixed, wherein
the first part consists of water and a source of metal ions optionally with one or more additives selected from the group of additives consisting of an inorganic filler, a flame retarder, a surface active compound, an amine, and a gelling agent, and wherein
the source of metal ions is a water soluble metal salt selected from the group consisting of phosphate, bromide, pyrophosphate, polyphosphate, bicarbonate, carbonate, chloride, sulfate, nitrate, nitrite, and mixtures of two or more of such salts; and wherein
the second part consists of an isocyanate optionally with one or more additives selected from the group of additives consisting of a plasticizer, an amine and a surface active compound, and wherein
the first and second parts do not contain a polyalcohol and form the foamed isocyanate material when mixed by hydrolysis of the isocyanate in the second part.

* * * * *